Aug. 18, 1942.   H. J. MURPHY   2,293,615

KNOB ATTACHMENT

Filed Feb. 24, 1941

Inventor:
Howard J. Murphy.
by John Todd
Atty.

Patented Aug. 18, 1942

2,293,615

UNITED STATES PATENT OFFICE 2,293,615

KNOB ATTACHMENT

Howard J. Murphy, Greenwood, Mass., assignor to United-Carr Fastener Corporation, Cambridge, Mass., a corporation of Massachusetts Application February 24, 1941, Serial No. 380,254

10 Claims. (Cl. 287—53)

This invention relates to knobs and like fastening installations and fasteners for the same.

Referring to the drawing, in which I have illustrated a preferred form of my invention:

This invention relates to improvements in knob devices which may be of the type used on radio dial panels or automobile instrument panels and is directed particularly to an improved fastener adapted to be quickly assembled with a knob of this type and operable to enable a shaft to be secured to the knob.

Figure 1:
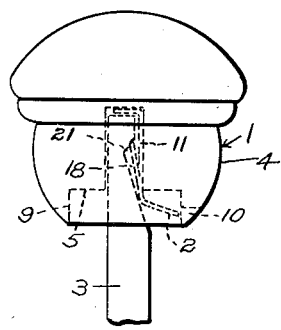
Fig. 1 is a side elevation of a knob member and shaft member secured thereto by means of my improved fastener.
Figure 2:
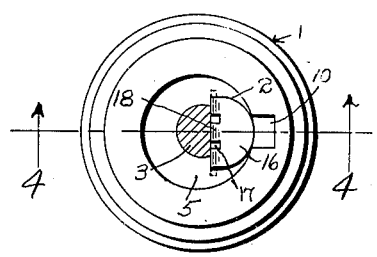
Fig. 2 is a bottom view of the installation shown in Fig. 1.
Figure 3:
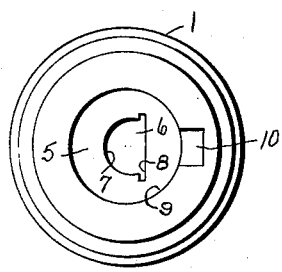
Fig. 3 is a bottom view of the knob member before attachment of the fastener thereto.

Referring in detail to the drawing, I have provided a knob 1, which may be plastic, wood, glass or other material, having my improved fastener member 2 assembled therewith and operable for cooperative engagement with a shaft 3 to secure the shaft in detachable assembly with the knob. The shaft may be of the type for connecting parts of radio, automobile and the like apparatus with finger operative knob means disposed in operating position on a dial or instrument board. The knob, in my preferred form, has a body 4 providing an end face 5 at one end. A non-circular opening 6 extends into the body 1 from the end face 5 and comprises a generally semi-circular shaft-receiving portion 7 and a second opening 8 of elongated form intersecting the shaft-receiving opening, as most clearly shown in Fig. 3. The opening 8 is adapted to receive an attaching portion of the fastener member in a manner to be described. The knob member preferably has a peripheral flange 9 extending beyond the end face 5 so as to conceal portions of the fastener member disposed exteriorly of the end face. The flange 9 has an opening 10 on one side thereof so as to permit a tool to pass through the flange for engagement with a releasing portion of the fastener member which operates to break fastener engagement between the fastener and the shaft permitting the shaft to be removed from the knob.

Figure 4:
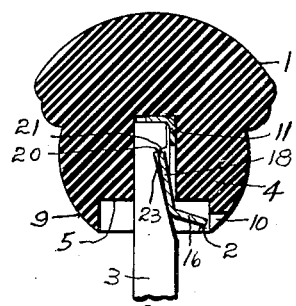
Fig. 4 is a section taken along the line 4—4 of Fig. 2.
Figure 5:
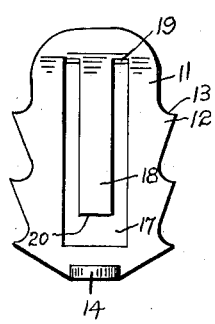
Fig. 5 is a front view of my improved fastener member per se.
Figure 6:
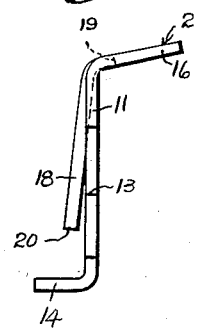
Fig. 6 is a side view of the fastener member shown in Fig. 5.

The fastener member 2 is preferably formed from one piece of spring metal and comprises an attaching portion in the form of a leg 11 adapted to enter the portion 8 of the opening 6 for securing the fastener member to the knob. The leg 11 has teeth 12 on opposed lateral edges providing shoulders 13 adapted to engage, and, in some cases, become embedded, in material of the body portion 1 adjacent the opening 8 to prevent detachment of the fastener member from the knob. A foot portion 14 extends laterally from one end of the leg 11 providing means permitting the fastener to be moved into engagement with the knob by a suitable tool which, after the fastener has been moved into the opening 6, operates to press the foot 14 against the bottom 15 of the aperture 6. A releasing portion in the form of a lip 16 is integrally joined to an opposite end of the leg 11 from the foot 14. The lip portion 16 preferably extends in angular relation to the leg 11 and is flexible relative to the leg pivoting around an imaginary line transverse to the fastener at the point of junction between the lip and the leg. The fastener has an opening 17 (Fig. 5) disposed entirely within the marginal edges thereof and extending from the leg 11 into the lip 16. A spring finger 18 is integrally joined to the edge 19 of the lip adjacent the aperture 17, as most clearly shown in Fig. 5. The spring finger 18 is taken from material within the opening 17 and normally extends in a plane disposed at an acute angle to the plane of the leg 11, as most clearly shown in Figs. 4 and 6, so as to project into the opening 7 when the fastener is finally assembled with the knob. The spring finger 18 has its free end 20 spaced a predetermined distance from the foot 14 to engage behind an overhang 21 of the shaft (Figs. 4 and 7) to lock the shaft in secure attachment to the knob.

Figure 7:
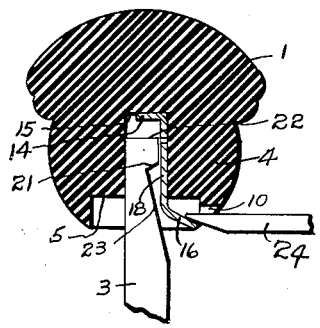
Fig. 7 is a section similar to Fig. 4 showing the manner in which the fastener is operated to release the shaft from the knob.

Assembly of the parts of the knob device is a relatively simple operation and is carried out by first moving the leg 11 into the aperture 8 with the foot 14 received by the aperture 7. Next, pressure is exerted on the foot 14 by a suitable tool inserted into the aperture 7 to force the foot portion against the bottom 15 of the aperture 6. The fastener member is now secured in firm engagement with the knob as the teeth 12 engage material of the knob adjacent the opening 8 to resist withdrawal of the fastener. When the fastener is in final assembly with the knob, the releasing lip 16 is disposed outside the end face 5 in opposite relation to the opening 10 in the wall 9. Furthermore, the lip 16 is spaced from the end face 5 enabling a tool to be moved between the lip and end face, as shown in Fig. 7.

It will be seen that when the knob and fastener are in final assembly, the finger 18 projects into the shaft-receiving opening 7. Thus, movement of the shaft end into the opening 7 operates to push the finger 18 into the aperture 17 of the leg 11 against the inherent tension of the fastener. When the free end 22 of the shaft is in abutting engagement with the foot 14, the cut-away portion 23 of the shaft is disposed opposite the finger 18 providing clearance to permit the finger to spring back toward normal position and engage its free end 20 behind the overhang 21. The shaft is now firmly attached to the knob and secured against unintentional withdrawal.

The shaft may be easily released from the knob by passing a tool 24 (Fig. 7) through the opening 10 to engage beneath the lip 16 and lift the same outwardly away from the end face 5. As a result of this action, the lip 16 fulcrums about its point of junction with the leg 11 causing the finger 18, which is integrally tied to the lip, to be drawn into the plane of the leg 11, as most clearly shown in Fig. 7, whereby the shaft may be readily withdrawn.

Although I have illustrated and described a preferred embodiment of my invention, I do not wish to be limited thereby because the scope of my invention is best defined by the following claims.

I claim:

1. A fastener installation comprising, in combination, an article of manufacture which may be a knob and having a shaft-receiving recess, a shaft having an overhang, and a fastener for securing said knob to said shaft, said fastener having attaching means extending into said knob for securing said fastener thereto, a spring portion disposed in said shaft-receiving recess and flexible on insertion of said shaft into said shaft-receiving recess to engage behind said overhang, and means forming a part of said fastener operable for moving said spring portion out of engagement with said overhang thereby to permit separation of said shaft from said knob.

2. A fastener installation comprising, in combination, an article of manufacture which may be a knob and having a shaft-receiving body and a shaft-receiving recess in said body, a shaft having an overhang, and a fastener for securing said article to said shaft, said fastener having attaching means extending into said body for securing said fastener thereto, a spring portion normally lying at an angle to the longitudinal axis of said shaft-receiving recess and flexible on insertion of said shaft into said recess to engage behind said overhang and means forming a part of said fastener disposed outside said body and operable to move said spring portion into parallel relationship with the longitudinal axis of said shaft-receiving recess thereby to permit separation of said shaft from said article.

3. A fastener installation comprising, in combination, an article of manufacture such as a knob and having a shaft-receiving body and a shaft-receiving recess in said body, a shaft having an overhang, and a fastener for securing said article to said shaft, said fastener having a leg extending into said body for securing said fastener thereto, a releasing portion integral with said leg and extending in angular relation thereto, and a spring portion integrally joined to said releasing portion, said spring portion normally lying at an angle to the longitudinal axis of said shaft-receiving recess and yieldable on insertion of said shaft into said recess to engage behind overhang, said releasing portion being flexible relative to said leg and operable when flexed to move said spring portion into parallel relationship with the longitudinal axis of said shaft-receiving recess to permit separation of said shaft from said article.

4. A fastener installation comprising, in combination, an article of manufacture such as a knob and having a shaft-receiving body formed with a shaft-receiving recess and a second recess intersecting said shaft-receiving recess, a shaft having an overhang, and a fastener for securing said article to said shaft, said fastener having a leg extending into said second recess and engaging the material of said body adjacent said second recess for securing said fastener to said article, a releasing portion integral with said leg, said releasing portion extending in angular relation to said leg and flexible relative thereto, and a spring portion integrally joined to said releasing portion, said spring portion normally lying at an angle to the longitudinal axis of said shaft-receiving recess and yieldable on insertion of said shaft into said shaft-receiving recess to engage behind said overhang, said releasing portion being disposed outside said body and operable when flexed to move said spring portion into parallel relationship with the longitudinal axis of said shaft-receiving recess to permit separation of said shaft from said article.

5. A fastener installation comprising, in combination, an article of manufacture such as a knob and having a shaft-receiving body provided with a shaft-receiving recess and a second recess intersecting said shaft-receiving recess, a shaft having an overhang, and a fastener for securing said article to said shaft, said fastener having a leg extending into said second recess, said leg having a projection in embedded engagement with the material of said body adjacent said second recess for securing said fastener to said article, a releasing portion integral with said leg and disposed outside said body when said parts are assembled, said releasing portion extending in angular relation to said leg and flexible relative thereto, and a spring portion integrally joined to said releasing portion, said spring portion normally lying at an angle to the longitudinal axis of said shaft-receiving recess and yieldable on insertion of said shaft into said shaft-receiving recess to engage behind said overhang, said releasing portion being operable when flexed to move said spring into parallel relation with the longitudinal axis of said shaft-receiving recess and into said second recess to permit separation of said shaft from said article.

6. A fastener installation comprising, in combination, an article of manufacture such as a knob and having a shaft-receiving body provided with a shaft-receiving recess and a second recess intersecting said shaft-receiving recess, a shaft having an overhang, and a fastener for securing said article to said shaft, said fastener having a leg extending into said second recess and engaging the material of said body adjacent said recess for securing said fastener to said article, a lip integrally joined to said leg at one end thereof, and a spring finger integrally joined to said lip and extending in a plane forming an acute angle with said leg, said finger normally lying at an angle to the longitudinal axis of said shaft-receiving recess and yieldable on insertion of said shaft into said recess to engage its outermost free end behind said overhang, said lip portion being operable when flexed to move said spring into parallel relation with the longitudinal axis of said shaft-receiving recess and into said second recess to permit separation of said shaft from said article.

7. A fastener installation comprising, in combination, an article of manufacture having a shaft-receiving body provided with a shaft-receiving recess in said body and a second recess intersecting said shaft-receiving recess, a shaft having an overhang, and a fastener for securing said article to said shaft, said fastener having a leg extending into said second recess and engaging the material of said body adjacent said recess for securing said fastener to said article, a lip integrally joined to said leg at one end thereof, said fastener having an opening in said leg extending into said lip portion and disposed entirely within the marginal edges of said fastener, and a spring finger integrally joined to said lip portion adjacent an edge of said opening, said finger being taken from the material of said opening and extending in a plane forming an acute angle with said leg, said finger normally lying at an angle to the longitudinal axis of said shaft-receiving recess and yieldable on insertion of said shaft into said recess to engage its outermost free end behind said overhang, said lip portion being operable when flexed to move said spring into parallel relation with the longitudinal axis of said shaft-receiving recess and substantially into the plane of said leg within the opening of said fastener to permit separation of said shaft from said article.

8. A fastener member for connecting a shaft with a recessed knob and the like comprising an attaching portion for securing said fastener to said knob, a releasing portion integrally joined to said attaching portion at one end thereof and flexible relative to said attaching portion, a spring finger portion integrally joined to said releasing portion and normally disposed in a plane forming an acute angle with the plane of said attaching portion, said finger being retractible toward said attaching portion on flexure of said releasing portion.

9. A fastener member for connecting a shaft with a recessed knob and the like comprising an attaching leg adapted to be embedded in said knob for securing said fastener thereto, a lip portion integrally joined to an end of said leg, said lip portion extending in angular relation to said leg and flexible relative thereto, said fastener having an opening extending from said leg into said lip portion and a spring finger integrally joined to an edge of said lip portion adjacent said opening, said finger normally extending in a plane disposed at an acute angle to the plane of said leg, and said finger being retractible on flexure of said lip portion for the purpose described.

10. A fastener member for connecting a shaft with a recessed knob and the like comprising an attaching leg for securing said fastener thereto, a lip portion integrally joined to an end of said leg, said lip portion extending in angular relation to said leg and flexible relative to said leg, said fastener having an opening extending from said leg into said lip portion and disposed entirely within the marginal edges of said leg, said fastener having narrow side portions between said opening and the exterior edges of said fastener, said side portions being serrated on their exterior edges for embedded engagement with said knob, and a spring finger integrally joined to an edge of said lip portion adjacent said opening, said finger being taken from the material of said fastener within said opening and normally extending in a plane disposed at an acute angle to the plane of said leg, said finger being retractible into said opening on flexure of said lip portion for the purpose described.

HOWARD J. MURPHY.